(12) United States Patent
Chacko et al.

(10) Patent No.: US 10,574,632 B2
(45) Date of Patent: Feb. 25, 2020

(54) SYSTEM AND METHOD FOR SECURE SHARING OF A SOURCE CODE

(71) Applicant: HCL Technologies Limited, Noida, Uttar Pradesh (IN)

(72) Inventors: Simy Chacko, Hyderabad (IN); Suresh Naidu P, Hyderabad (IN); Shiva Sholayappan, Hyderabad (IN); S U M Prasad Dhanyamraju, Hyderabad (IN)

(73) Assignee: HCL Technologies Limited, Noida, Uttar Pradesh ( * ) Notice: Subject to any disclaimer, the term of this patent is extended or adjusted under 35 U.S.C. 154(b) by 256 days.

(21) Appl. No.: 15/615,759

(22) Filed: Jun. 6, 2017

(65) Prior Publication Data

US 2018/0007017 A1  Jan. 4, 2018

(30) Foreign Application Priority Data

Jun. 30, 2016 (IN) .............................. 201611022494

(51) Int. Cl.
*H04L 29/06* (2006.01)
*G06F 11/36* (2006.01)
*G06F 21/10* (2013.01)

(52) U.S. Cl.
CPC ........ *H04L 63/0428* (2013.01); *G06F 11/362* (2013.01); *G06F 11/3604* (2013.01); *G06F 21/10* (2013.01); *H04L 63/068* (2013.01); *G06F 11/3668* (2013.01); *H04L 63/101* (2013.01); *H04L 2209/16* (2013.01); *H04L 2463/103* (2013.01)

(58) Field of Classification Search
CPC ............... H04L 63/0428; H04L 63/068; H04L 2463/103; H04L 63/101; H04L 2209/16; G06F 21/10; G06F 11/362; G06F 11/3668; G06F 11/3604
See application file for complete search history.

(56) References Cited

U.S. PATENT DOCUMENTS

| 6,668,325 B1 * | 12/2003 | Collberg | G06F 21/14 713/194 |
|---|---|---|---|
| 6,684,389 B1 * | 1/2004 | Tanaka | G06F 8/41 717/140 |
| 7,503,041 B2 * | 3/2009 | Butterweck | G06F 8/60 717/168 |
| 7,549,147 B2 * | 6/2009 | Futoransky | G06F 21/125 380/277 |

(Continued)

*Primary Examiner* — J. Brant Murphy
(74) *Attorney, Agent, or Firm* — HM Law Group LLP; Vani Moodley, Esq.

(57) ABSTRACT

The system and method for secure sharing of a source code is disclosed. The method comprises. The method comprises receiving a source code associated with an application, and a defect identification number associated with a defective feature in the application. The method comprises identifying a defective feature of an application and non-defective features of the application based on a defect investigation methodology. The method comprises generating a checkout ID associated with the application and further generates a secured second set of source code based on one of an encryption methodology and an obfuscating methodology. The method further comprises providing a secured source code to a third party for debugging the defective feature in the application.

15 Claims, 3 Drawing Sheets

(56) References Cited

U.S. PATENT DOCUMENTS

| | | | | |
|---|---|---|---|---|
| 8,121,874 B1* | 2/2012 | Guheen | G06Q 10/063 | 705/7.11 |
| 8,549,465 B2* | 10/2013 | Allen | G06F 8/70 | 717/100 |
| 8,661,549 B2* | 2/2014 | Chevallier-Mames | G06F 21/10 | 726/22 |
| 9,183,360 B1* | 11/2015 | Wendling | G06F 8/34 | |
| 2003/0097573 A1* | 5/2003 | Wheeler | G06Q 20/4014 | 713/182 |
| 2003/0221116 A1* | 11/2003 | Futoransky | G06F 21/125 | 713/189 |
| 2005/0120232 A1* | 6/2005 | Hori | G06F 21/10 | 713/193 |
| 2006/0005182 A1* | 1/2006 | Butterweck | G06F 8/60 | 717/175 |
| 2006/0184829 A1* | 8/2006 | Cheong | G06F 11/3604 | 714/39 |
| 2012/0222007 A1* | 8/2012 | Allen | G06F 8/70 | 717/122 |
| 2013/0232578 A1* | 9/2013 | Chevallier-Mames | G06F 21/10 | 726/26 |
| 2014/0082657 A1* | 3/2014 | McReynolds | G06F 21/10 | 725/31 |
| 2015/0261650 A1* | 9/2015 | Li | G06F 11/362 | 717/124 |
| 2015/0310209 A1* | 10/2015 | Zhang | G06F 8/61 | 717/174 |
| 2016/0378637 A1* | 12/2016 | Gamble | G06F 11/362 | 707/702 |
| 2017/0353458 A1* | 12/2017 | Lipke | G06F 11/362 | |

* cited by examiner

SYSTEM AND METHOD FOR SECURE SHARING OF A SOURCE CODE

CROSS-REFERENCE TO RELATED APPLICATIONS AND PRIORITY

The present application claims priority from Indian Patent Application No. 201611022494 filed on 30 Jun. 2016, the entirety of which is hereby incorporated by reference.

TECHNICAL FIELD

The present subject matter described herein, in general relates to a method and a system for a secure sharing of a source code with a third party and other vendors along with the maintenance of a source code in the software program.

BACKGROUND

Most of the global software population is engaged in modifying existing applications rather than writing new software applications. It is common for a software product owner to outsource the sustenance work of their product to third party vendors. However, outsourcing requires sharing the source code of software that may contain a wide array of proprietary knowledge and trade secrets. Out of all, source code of software is the key asset which internally contains proprietary knowledge which may be easily reused. Only protection mechanism that exists today is through legal process such as Non-Disclosure Agreements (NDA). Typically, the product owners engage third party vendors by signing an NDA or some legal agreement that binds the third party vendors to further ensure the security and integrity of the source code and other proprietary knowledge from being leaked.

The other manner of enforcing the security and protecting the source code from possible infringement by the third party vendors is to either work in a resource augmented mode where the vendor would supply resources who would work from product owner's premise or the vendors would connect to the product owner's network (through VPN, etc.) and have access to the source code where the network security of the parent domain will enforce the security. Even though the above mentioned methods are tested and widely used process to ensure the security of source code. The methods expose the entire source code to the vendors/third-party with possible probability of leakages in some or the other form.

SUMMARY

Before the present systems and methods for a secure sharing of a source code are described, it is to be understood that this application is not limited to the particular systems, and methodologies described, as there can be multiple possible embodiments which are not expressly illustrated in the present disclosure. It is also to be understood that the terminology used in the description is for the purpose of describing the particular implementations or versions or embodiments only, and is not intended to limit the scope of the present application. This summary is provided to introduce aspects related to a system and a method for a secure sharing of a source code. This summary is not intended to identify essential features of the claimed subject matter nor is it intended for use in determining or limiting the scope of the claimed subject matter.

In one implementation, a method for secure sharing of a source code is disclosed. In one aspect, the method may comprise receiving a source code associated with an application and a defect identification number associated with a defective feature in the application. Further the method may comprise, identifying a first set of source code and a second set of source code from the source code based on a defect investigation methodology and the defect identification number. The first set of source code is associated with a defective feature of an application; the second set of source code is associated with one or more non-defective features of the application. The first set of source code comprises a first set of source code modifications and one or more secondary source code. Further the method may comprise, generating a checkout ID associated with the application. The checkout ID comprises of access parameters and an expiration time. The expiration time is indicative of an access time to a third party based on a predefined policy. Further the method may comprise, generating a secured second set of source code based on the second set of source code and one of an encryption methodology and an obfuscating methodology. Further the method may comprise, providing a secured source code and the checkout ID to a third party for debugging the defective feature in the application, wherein the secured source code further comprises the first set of source code and the secured second set of source code.

In one implementation, a system for secure sharing of a source code is disclosed. In one aspect, the system comprises a memory and a processor coupled to the memory. Further, the processor may be capable of executing instructions in the memory to perform one or more steps. In the aspect, the system may comprise receiving a source code associated with an application, and a defect identification number associated with a defective feature in the application. Further the system may comprise, identifying a first set of source code and a second set of source code from the source code based on a defect investigation methodology and the defect identification number. The first set of source code is associated with a defective feature of an application; the second set of source code is associated with one or more non-defective features of the application. The first set of source code comprises a first set of source code modifications and one or more secondary source code. Further the system may comprise, generating a checkout ID associated with the application. The checkout ID comprises of access parameters and an expiration time. The expiration time is indicative of an access time to a third party based on a predefined policy. Further, the system may comprise, generating a secured second set of source code based on the second set of source code and one of an encryption methodology and an obfuscating methodology. Further the system may comprise, providing a secured source code and the checkout ID to a third party for debugging the defective feature in the application. The secured source code further comprises the first set of source code and the secured second set of source code.

In yet another implementation, non-transitory computer readable medium embodying a program executable in a computing device for secure sharing of a source code is disclosed. In one aspect, the program may comprise a program code receiving a source code associated with an application, and a defect identification number associated with a defective feature in the application. Further the program may comprise a program code for, identifying a first set of source code and a second set of source code from the source code based on a defect investigation methodology and the defect identification number. The first set of source code is associated with a defective feature of an application; the second set of source code is associated with one or more non-defective features of the application. The first set of source code comprises a first set of source code modifications and one or more secondary source code. Further the program may comprise a program code for, generating a checkout ID associated with the application. The checkout ID comprises of access parameters and an expiration time. The expiration time is indicative of an access time to a third party based on a predefined policy. Further the program may comprise a program code for, generating a secured second set of source code based on the second set of source code and one of an encryption methodology and an obfuscating methodology. Further the program may comprise a program code and the checkout ID for controlling one or more functionality, providing a secured source code to a third party for debugging the defective feature in the application. The secured source code further comprises the first set of source code and the secured second set of source code.

BRIEF DESCRIPTION OF DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for secure sharing of a source code, similar or equivalent to those described herein can be used in the practice or testing of embodiments of the present disclosure, the exemplary, systems and methods for secure sharing of a source code are now described. The disclosed embodiments for secure sharing of a source code are merely examples of the disclosure, which may be embodied in various forms.

Various modifications to the embodiment will be readily apparent to those skilled in the art and the generic principles herein may be applied to other embodiments for secure sharing of a source code. However, one of ordinary skill in the art will readily recognize that the present disclosure for secure sharing of a source code is not intended to be limited to the embodiments described, but is to be accorded the widest scope consistent with the principles and features described herein.

While aspects of described system and method for secure sharing of a source code may be implemented in any number of different computing systems, environments, and/or configurations, the embodiments are described in the context of the following exemplary system.

Figure 1:
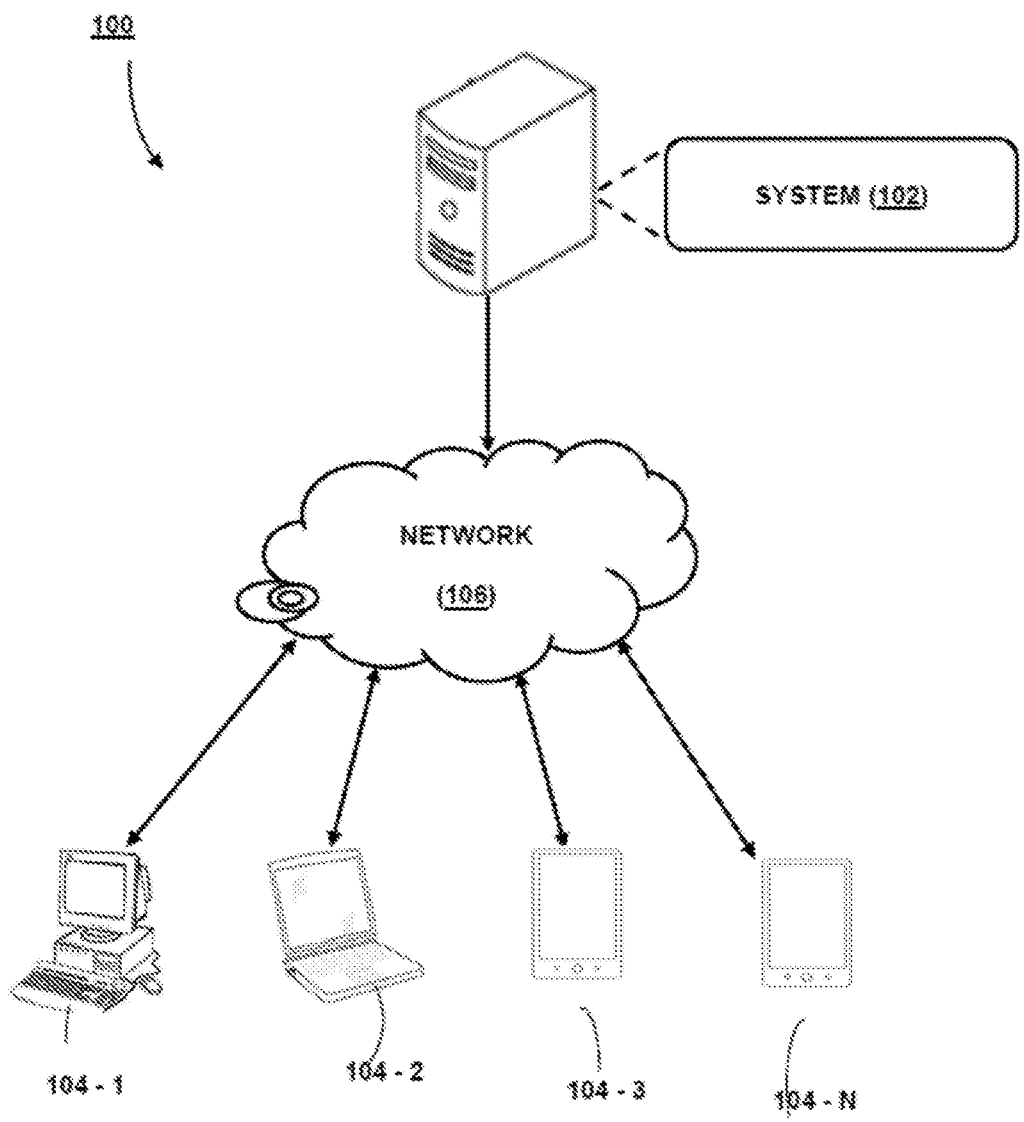
FIG. 1 illustrates a network implementation of a system for secure sharing of a source code, in accordance with an embodiment of the present subject matter.

Referring now to FIG. 1, a network implementation (100) of a system (102) for secure sharing of a source code is illustrated, in accordance with an embodiment of the present subject matter. Although the present subject matter is explained considering that the system (102) is implemented on a server, it may be understood that the system (102) may also be implemented in a variety of computing systems, such as a laptop computer, a desktop computer, a notebook, a workstation, a mainframe computer, a server, a network server, and the like.

In one embodiment, the system (102) may be implemented in a cloud-based environment. It will be understood that the system 102 may be accessed by multiple users through one or more user devices 104-1, 104-2 . . . 104-N, collectively referred to as user device (104) hereinafter, or applications residing on the user device (104). Examples of the user device (104) may include, but are not limited to, a portable computer, a personal digital assistant, a handheld device, a workstation and the like. The user device (104) is communicatively coupled to the system (102) through a network (106). The user devices 104 are communicatively coupled to the system (102) through a network (106).

In one implementation, the network (106) may be a wireless network, a wired network or a combination thereof. The network (106) can be implemented as one of the different types of networks, such as intranet, local area network (LAN), wide area network (WAN), the internet, and the like. The network (106) may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network (106) may include a variety of network devices, including routers, bridges, servers, computing devices, storage devices, and the like.

Figure 2:
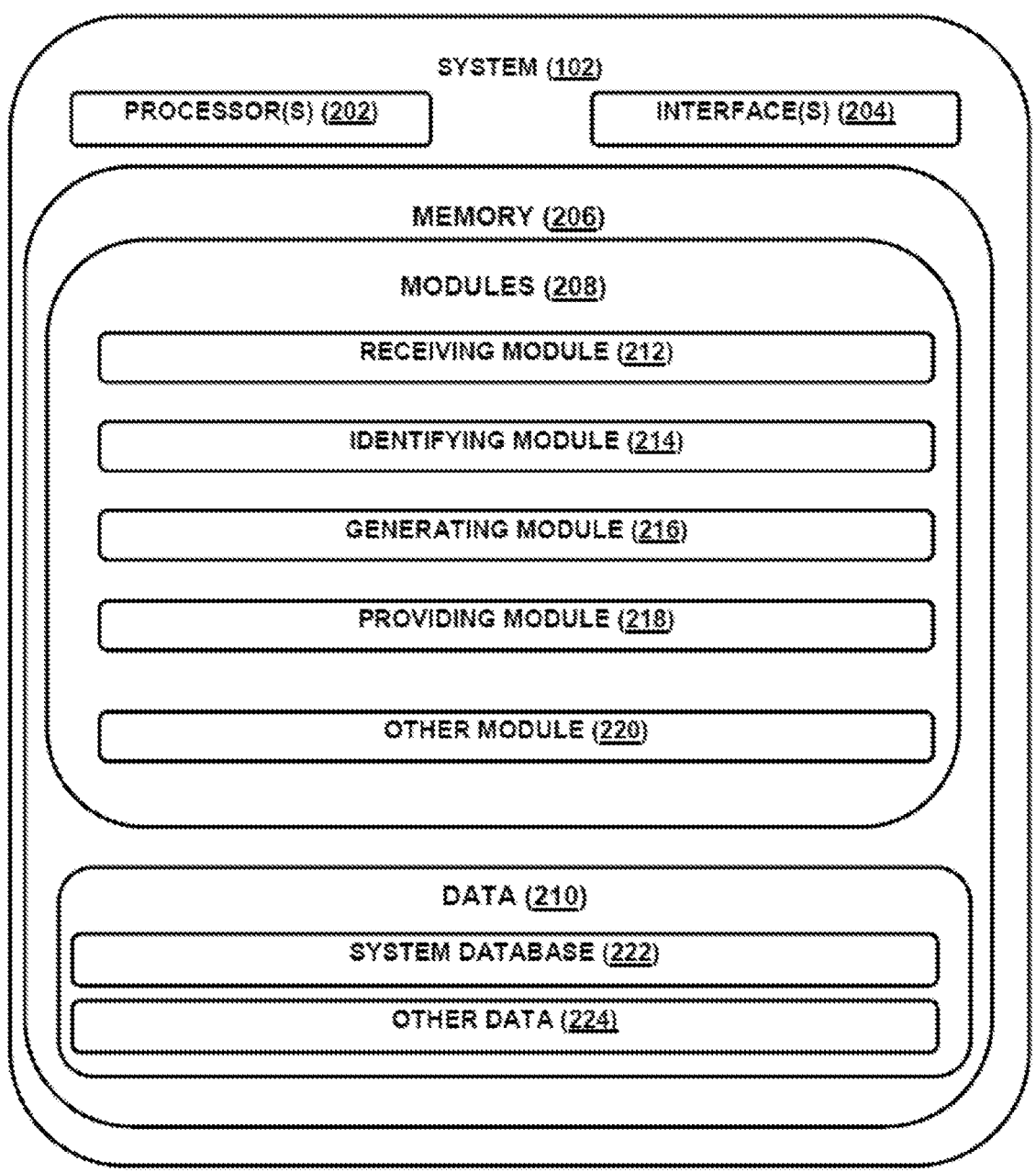
FIG. 2 illustrates system and its subcomponents for secure sharing of a source code, in accordance with an embodiment of the present subject matter.

Referring now to FIG. 2, the system (102) is illustrated in accordance with an embodiment of the present subject matter. In one embodiment, the system (102) may include at least one processor (202), an input/output (I/O) interface (204), and a memory (206). The at least one processor (202) may be implemented as one or more microprocessors, microcomputers, microcontrollers, digital signal processors, central processing units, state machines, logic circuitries, and/or any devices that manipulate signals based on operational instructions. Among other capabilities, the at least one processor (202) is configured to fetch and execute computer-readable instructions stored in the memory (206).

The I/O interface (204) may include a variety of software and hardware interfaces, for example, a web interface, a graphical user interface, and the like. The I/O interface (204) may allow the system (102) to interact with a user directly or through the user devices (104). Further, the I/O interface (204) may enable the system (102) to communicate with other computing devices, such as web servers and external data servers (not shown). The I/O interface (204) can facilitate multiple communications within a wide variety of networks and protocol types, including wired networks, for example, LAN, cable, etc., and wireless networks, such as WLAN, cellular, or satellite. The I/O interface (204) may include one or more ports for connecting a number of devices to one another or to another server.

The memory (206) may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory (206) may include modules (208) and data (210).

The modules (208) include routines, programs, objects, components, data structures, etc., which perform particular tasks, functions or implement particular abstract data types. In one implementation, the modules (208) may include a receiving module (212), an identifying module (214), a generating module (216), a providing module (218), and other modules (220). The other modules (220) may include programs or coded instructions that supplement applications and functions of the system (102).

The data (210), amongst other things, serves as a repository for storing data processed, received, and generated by one or more of the modules (208). The data (210) may also include a system database (222), and other data (224). The other data (224) may include data generated as a result of the execution of one or more modules in the other modules (220). Further, each of the aforementioned modules is explained in detail in subsequent paragraphs of the specification.

Receiving Module (212)

In one implementation, the receiving module (212) may receive a source code associated with an application. Further, the receiving module may receive a defect identification number associated with a defective feature on the application. The defect identification number relates to defect in the source code which a third party is required to debug or fix. This identification number is unique to a defect.

Identifying Module (214)

In one implementation, the identifying module (212) may identify a first set of source code and a second set of source code from the source code and the defect identification number received from the receiving module. Further, the first set of source code and the second set of source code is identified using defect investigation methodology. In one implementation, the first set of source code is associated with a defective feature of an application and the second set of source code is associated with one or more non-defective features of the application. Further, the first set of source code comprises a first set of source code modifications and one or more secondary source code.

In one implementation, the defect investigation methodology comprises receiving the parameters such as defect identification number, level of dependencies of the defective feature that is required to be debugged or fixed by the third party and the timeframe when the defect would have been introduced in the source code. In an exemplary embodiment a defect identification number is assigned to a defect. Further, the probable timeframe when the defect would have been introduced in the source code is identified by noting the changes that may have happened to the source code elements in the previous 'X' number of days. The changes that may have happened to the source code elements in the previous 'X' number of days and not related to the mapped feature of the defect identification number are filtered out. Based on the above the first set of source code modifications, for a first set of source code, having a defective feature of an application is identified. Further, to the identification of the probable timeframe when the defect would have been introduced, the level of dependencies upto which the third party is required to debug the source code elements is identified. The one or more secondary source code dependent on the first set of source code modifications based on the level of dependencies of the defective feature are identified. In one implementation call-flow information may be utilized to provide the complete set of dependencies in a source code that maybe are linked to the identified area. In one implementation the defect mapping and a source code mapping techniques maybe utilized to classify the set of source code modifications in to the first set of source code modifications and a second set of source code modifications.

In one implementation, the first set of source code modifications and a second set of source code modifications maybe identified using defect mapping technique. A one or more features and sub-features associated with an application maybe identified. The features may further be mapped to keywords, synonyms and heuristic rules. Each feature and the mapped keywords, synonyms may be provided a defined weightage. Thus, all the entities that maybe title, description, module and version are extracted for a defect attribute. Further, the keywords, synonyms and heuristic rules for a feature maybe mapped with the defect attribute to arrive at a score. The score is based on the number or occurrences of the defect attribute and the defined weightage. In an exemplary embodiment, the score maybe be calculated using the below principle:

Score<=Sum of (number of occurrence*weightage of the term)

It is to be understood that keywords that have occurred in more number of defects will have less weightage while the additional heuristic rules are applied to boost the score. Further, the defect to a feature is mapped based on the score and the area of defect is the area where the matching score is high.

Similarly, in one implementation, the first set of source code modifications and a second set of source code modifications maybe identified using source code mapping technique. In the technique, a one or more feature and sub-feature and a one or more element of a source code associated with an application maybe identified. The one or more features are mapped to keywords, synonyms and heuristic rules with a defined weightage. While the element of a source code may comprise files, classes, methods. Further, a one or more element attribute comprising of one of code comments, variable names, element name and annotations maybe extracted. The keywords and synonyms of each feature maybe matched with source code elements to arrive at a score based on number of matches. In a further step, a score maybe provided based on the number or occurrences of the defect attribute to keywords match and synonyms of each and the defined weightage. In an exemplary embodiment, the score maybe be calculated using the below principle:

Score<=Sum of (number of occurrence*weightage of the term)

It is to be understood that keywords that have occurred in more number of defects will have less weightage while the additional heuristic rules are applied to boost the score. Further, the defect to an element of a source code is mapped based on the score that is the feature where the matching score is high is the defect to an element.

Generating Module (216)

In one implementation, the generating module (216) generates a unique checkout identifier (checkout ID) associated with the application. The checkout ID may comprise of associated access parameters and an expiration time. The expiration time is indicative of access time to third party based on pre-defined policy and the code elements associated with the defect. Further, a secured second set of source code is generated using the generating module (216) based either encryption methodology or an obfuscating methodology. The secured second set of source code is the second set of source code that maybe associated with one or more non-defective features of the application. Further, the generating module may selectively utilize the encryption methodology or the obfuscation methodology based on the compiler of the third party or the vendor. In an exemplary implementation, for a standard compiler the generating module (216) may obfuscate the second set of source code to generate a secured second set of source code. In another exemplary implementation, the second set of source code maybe secured to generate the secured second set of source code if the third party of the vendor utilizes the special compiler or a compiler different from the standard compiler. On generating the secured second set of source code only the identified areas of non-defective feature may be protected from the source code associated with an application.

In one implementation, a random key may be generated for each method of encryption. The body of each function may be encrypted using the random key. Further, in one implementation, the encryption keys may be stored against the checkout ID and that may vary for every function. An independent key may be identified for each code element. Access permission as well as encryption key for each function may be stored in server for pre-defined period of time. In one exemplary embodiment, the access permission to each function maybe embedded as follows:

```
public class HelloWorld {
    CommentBlock:
    NC4JSWR1bnRpZn1pbmcgdGh1TGNoYW5nZX
    MgaGFwcGVuZWQgdG8gdGh1IGN==
    Permission: NotVisible
  public static void main(String[ ] args) {
    Code:
    NC4JSWR1bnRpZn1pbmcgdGh1IGNoYW5nZX
    MgaGFwcGVuZWQgdG8gdGh1TGNvZGUgZWx1
    bWVudHMgaW4gdGh1IGxhc3QgWCBkYX1zLi
    BGaWx0ZXIgb3V0THRoZSBjaGFuZ2VzTHRo
    YXQgYXJ1IG5vdCByZWxhdGVkIHRvIG1hcH
    kTHRvTG1hcH==
    Permission: Editable/Visible/Masked/Literals-masked/NotVisible
  }
}
```

In one implementation, the obfuscation maybe performed on the body of the code elements for a standard compiler by using the obfuscation methods such as removing all the comments from the code, removing the white spaces in the source code so as to render it difficult understand, swapping and replacing the variable names within the blocks, replacing the integer literals with compound values, replacing the string literals with their binary equivalent, replacing the private method with arbitrary literals and modifying the referenced locations. It is understood that the replacement of private methods would be excluded if the method is referenced to the method that may not be obfuscated.

Further, in one implementation, obfuscation maybe performed by injecting random polymorphic code at random location that may internally check for the validity/expiration of the checked out code. It may further prevent the normal execution of the code by throwing exceptions after the validity is expired and return error. In one exemplary embodiment, the code is partially obfuscated by standard procedures so as to allow the end user to debug the code and restrict the use of the source code by using polymorphic blocks that may prevent the end user from using the code and binary after the defined timeframe. In one exemplary embodiment, obfuscation maybe applied to the second set of source in the following manner, wherein the source code before obfuscation maybe be as:

```
//Adding a test comment
public static void main( )
{
    int i = 10;
    string str = "This is a test string";
    system.out.println(i + ". " + str);
}
```

And the source code on applying obfuscation maybe:

```
public static void main( )
{int xxx = (1004-994); policyCheck( );string myvar1234 =
["\x54\x68\x69\x73\x20\x69\x73\x20\x61\x20\x74\x65\x73\x74\
x20\x73\x74\x72\x69\x6E\x67"];system.out.println(i+" ["\x2E"]
"+str);checkpolicyfornow( );}
```

Providing Module (218)

In one implementation, the providing module (218) may provide a secured source code to a third party for debugging the defective feature in the application. The secured source code may comprise the first set of source code and the secured second set of source code. In one implementation, the Integrated Development Environment (IDE) maybe used to view/edit/browse the source code, while the compiler maybe used to compile the code to function of the source code.

In one implementation, the compiler maybe used to receive the decryption keys and the permission for decryption from the server using the checkout ID. The decryption keys are received from the server and maybe be locally cached for a period that is defined by the server based on the predefined policy. In one implementation, the checkout ID may also comprise randomized binary that maybe protected using embedded code that restricts the use of binary in any form after the specified timeframe. Further, the binary is protected from edit or referenced post the expiry of the specified timeframe.

Further, in one implementation, the code decrypted for view or compile may not be stored in the non-volatile memory. However, the methods with edit access permission maybe saved in non-volatile memory on encrypted format using the keys associated with the checkout ID. Furthermore, the compiler may insert code snippets to different methods that may make the binary inactive after the expiry period of the checkout ID. For secured sharing of the source code the server may share the keys to IDE and compiler only after assuring that the IDE and the compiler binaries are trusted and non-modified. The binaries are compiled to with the instrumented code to restrict the usage of binary by protecting the binary.

Exemplary embodiments for secure sharing a source code as discussed above may provide certain advantages. Though not required to practice aspects of the disclosure, these advantages may include those provided by the following features.

Some embodiments may enable a system and method to share the source code by enabling the third party vendors to view only the portion of the code where the defect exists and allow the third party vendor to compile and use the source code in debug mode.

Some embodiments may enable a system and method to allow the third party vendor to work and build on the source code only for a pre-defined period i.e. until the validity of the checkout ID.

Some embodiments may enable a system and method to store the source code of a software program in the non-volatile memory of third party only in an encrypted form.

Some embodiments may enable a system and method to invalidate the source code from the server side by expiring the checkout ID.

Some embodiments may enable a system and method to protect the source code from all kinds of theft and malware attach with minimal usability impact to the user.

Figure 3:
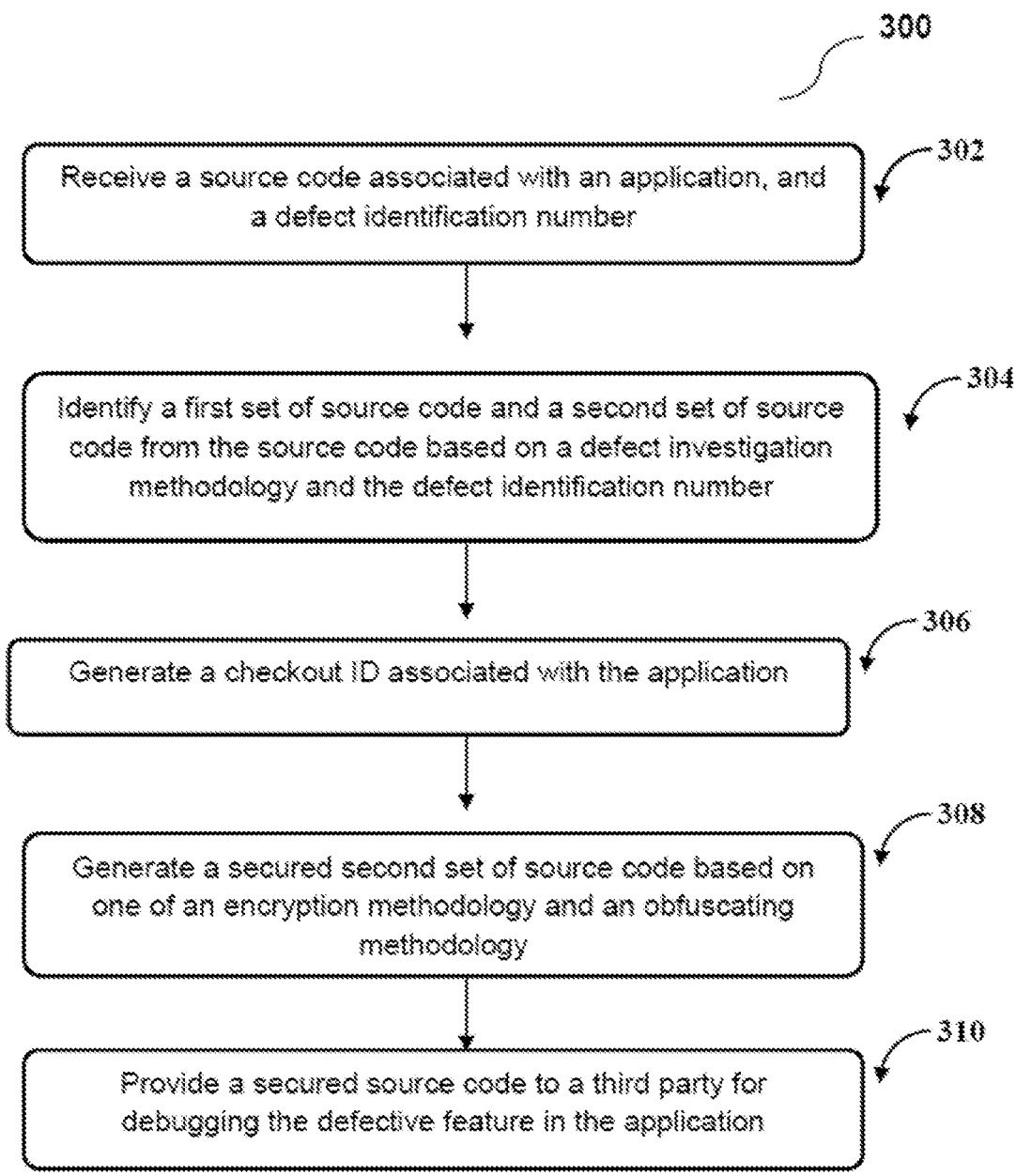
FIG. 3 illustrates a flow diagram for secure sharing of a source code, in accordance with an embodiment of the present subject matter.

Referring now to FIG. 3, a method 300 for secure sharing of a source code with a third party and other vendors along with the maintenance of a source code in the software is disclosed, in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method (300) is described is not intended to be construed as a limitation, and any number of the described method blocks can be combined in any order to implement the method (300) or alternate methods. Additionally, individual blocks may be deleted from the method (300) without departing from the spirit and scope of the subject matter described herein. Furthermore, the method (300) can be implemented in any suitable hardware, software, firmware, or combination thereof. However, for ease of explanation, in the embodiments described below, the method (300) may be considered to be implemented in the above described system (102).

At block (302), source code associated with an application is received. In one example, defect identification number associated with a defective feature in the application is also received. In one embodiment, the receiving module (312) may receive a source code associated with the application and a defect identification number associated with a defective feature in the application and store in system database (222).

At block (304), a first set of source code and a second set of source code from the source code based on a defect investigation methodology and the defect identification number is identified. In one embodiment, the identifying module (314) may identify the first set of source code that is associated with a defective feature of an application and the second set of source code that is associated with one or more non-defective features of the application and store the first set of source code and the second set of source code in system database (222).

At block (306), a checkout ID associated with the application is generated. In one embodiment, the generating module (316) is configured to generate checkout ID that comprises the access parameters and an expiration time based on the pre-defined policy and store in system database (222).

At block (308), a secured second set of source code is generated. In one example, secured second set of source code may be generated using an encryption methodology and an obfuscating methodology. In one embodiment, the generating module (318) is configured to generate a secured second set of source code and store the secured second set of source code in system database (222).

At block (310), a secured source code is provided to a third party for debugging the defective feature in the application. In one embodiment, the providing module (320) is configured to provide the secured source code that comprises the first set of source code and the secured second set of source code to a third party and store the data in system database (222).

Exemplary embodiments discussed above may provide certain advantages. Though not required to practice aspects of the disclosure, these advantages may include a method and system for secure sharing of a source code to a third party or vendor.

Although implementation for methods and systems for secure sharing of a source code has been described, it is to be understood that the appended claims are not necessarily limited to the specific features or methods described. Rather, the specific features and methods are disclosed as examples of implementations for secure sharing of a source code in the software program.

We claim:

1. A method for secured sharing of source code associated with an application to a third party for debugging, the method comprising:

receiving, by a processor (202), a source code associated with an application, and a defect identification number associated with a defective feature in the application;

identifying, by the processor (202), a first set of source code and a second set of source code from the source code based on a defect investigation methodology and the defect identification number, wherein the first set of source code is associated with the defective feature in the application, the second set of source code is associated with one or more non-defective features of the application, and wherein the first set of source code comprises a first set of source code modifications and one or more secondary source code;

generating, by the processor (202), a checkout ID associated with the application, wherein the checkout ID comprises access parameters and an expiration time, and wherein the expiration time is indicative of an access time to a third party based on a pre-defined policy;

generating, by the processor (202), a secured second set of source code based on the second set of source code and one of an encryption methodology and an obfuscating methodology; and providing, by the processor (202), a secured source code and the checkout ID to the third party for debugging the defective feature in the application, wherein the secured source code further comprises the first set of source code and the secured second set of source code.

2. The method of claim 1, wherein the defect investigation methodology comprises:

receiving, by the processor (202), a level of dependencies of the defective feature, and a timeframe for introduction of the defective feature in the application;

identifying, by the processor (202), a set of source code modifications done to the source code based on the timeframe for introduction of the defective feature in the application;

classifying, by the processor (202), the set of source code modifications in to the first set of source code modifications and a second set of source code modifications based on a defect mapping and a source code mapping, wherein the first set of source code modifications is associated with the defective feature of the application, and the second set of source code modifications is associated with one or more non-defective features of the application; and identifying, by the processor (202), one or more secondary source code dependent on the first set of source code modifications based on the level of dependencies of the defective feature.

3. The method of claim 2, the defect mapping further comprises:

identifying, by the processor (202), one or more feature and one or more sub-feature associated with the application, wherein the one or more feature is mapped to one or more keywords with a defined weightage;

extracting, by the processor (202), a one or more defect attribute from the source code, wherein the one or more defect attribute comprises one of title, description, module and version;

matching, by the processor (202), the one or more defect attribute with the one or more keywords;

scoring, by the processor (202), the matching based on a number of occurrences of the defined weightage;

mapping, by the processor (202), the defective feature to a feature wherein the scoring is high.

4. The method of claim 2, the source code mapping further comprising:

identifying, by the processor (202), a one or more feature and one or more sub-feature and a one or more element of the source code associated with the application, wherein the one or more feature is mapped to one or more keywords, with a defined weightage, wherein, the one or more element of the source code comprises files, classes, methods;

extracting, by the processor (202), a one or more element attribute from the source code wherein the one or more element attribute comprises one of code comments, variable names, element name and annotations;

matching, by the processor (202), the one or more element attribute to keywords mapped with the one or more feature;

scoring, by the processor (202), the matching based on a number of occurrences of the defect attribute to keywords and the defined weightage; and mapping, by the processor (202), the one or more element of the source code to a feature wherein the scoring is high.

5. The method of claim 1, the encryption methodology further comprising:

identifying, by the processor (202), a method and a body associated with the second set of source code;

creating, by the processor (202), a random key associated with the method, based on an encryption;

setting, by the processor (202), the expiration time to the random key for the method; and applying, by the processor (202), the encryption on the body using the random key, thereby generating the secured second set of source code.

6. The method of claim 1, the obfuscating methodology further comprising:

identifying, by the processor (202), a method and a body associated with the second set of source code;

applying, by the processor (202), obfuscation on the second set of source code wherein the obfuscation comprises one or more of a removal of comments from the second set of source code, a removal of white spaces from the second set of source code, a swapping of variable names within blocks, a replacing integer literals with compound values, a replacing private method with arbitrary literals, a modifying referenced locations and injecting a polymorphic source code at one or more location in the second set of source code, thereby generating the secured second set of source code.

7. The method of claim 1, further comprising:

compiling, by the processor (202), the secured source code by a compiler, wherein the compiler retrieves an encryption key, an access permission from the checkout ID and decrypts the secured source code using the encryption key and the access permission; and verifying, by the processor (202), an expiration time of the checkout ID and checking in the first set of source code modifications to the source code associated with the application.

8. A system for secured sharing of source code associated with an application to a third party for debugging, the system comprising:

a memory (206); and a processor (202) coupled to the memory, wherein the processor is capable of executing instructions to perform steps of:

receiving a source code associated with an application, and a defect identification number associated with a defective feature in the application;

identifying a first set of source code and a second set of source code from the source code based on a defect investigation methodology and the defect identification number, wherein the first set of source code is associated with the defective feature of the application, the second set of source code is associated with one or more non-defective features of the application, and wherein the first set of source code comprises a first set of source code modifications and one or more secondary source code;

generating a checkout ID associated with the application, wherein the checkout ID comprises access parameters and an expiration time, and wherein the expiration time is indicative of an access time to a third party based on a pre-defined policy;

generating a secured second set of source code based on the second set of source code and one of an encryption methodology and an obfuscating methodology; and providing a secured source code and the checkout ID to the third party for debugging the defective feature in the application, wherein the secured source code further comprises the first set of source code and the secured second set of source code.

9. The system of claim 8, wherein the defect investigation methodology comprises:

receiving a level of dependencies of the defective feature, and a timeframe for introduction of the defective feature in the application;

identifying a set of source code modifications done to the source code based on the timeframe for introduction of the defective feature in the application;

classifying the set of source code modifications in to the first set of source code modifications and a second set of source code modifications based on a defect mapping and a source code mapping, wherein the first set of source code modifications is associated with the defective feature of the application, and the second set of source code modifications is associated with one or more non-defective features of the application; and identifying one or more secondary source code dependent on the first set of source code modifications based on the level of dependencies of the defective feature.

10. The system of claim 9, the defect mapping further comprises:

identifying one or more feature and one or more sub-feature associated with the application, wherein the one or more feature is mapped to one or more keywords, with a defined weightage;

extracting a one or more defect attribute, wherein the one or more defect attribute from the source code comprises one of title, description, module and version;

matching the one or more defect attribute with the one or more keywords;

scoring the matching based on a number of occurrences of the defined weightage; and mapping the defective feature to a feature wherein the scoring is high.

11. The system of claim 9, the source code mapping further comprising:

identifying a one or more feature and sub-feature and a one or more element of the source code associated with the application, wherein the one or more feature is mapped to keywords, synonyms and heuristic rules with a defined weightage, wherein, the one or more element of the source code comprises files, classes, methods;

extracting a one or more element attribute wherein the one or more element attribute comprises one of code comments, variable names, element name and annotations;

matching the one or more element attribute to keywords mapped with the one or more feature wherein the matching provides a score based on a number of occurrences of the defect attribute to keywords and the defined weightage; and mapping the one or more element of the source code to a feature wherein the score is high.

12. The system of claim 8, the encryption methodology further comprising:

identifying a method and a body associated with the second set of source code;

creating a random key associated with the method, based on an encryption;

setting the expiration time to the random key for the method; and applying the encryption on the body using the random key, thereby generating a secured second set of source code.

13. The system of claim 8, the obfuscating methodology further comprising:

identifying a method and a body associated with the second set of source code;

applying obfuscation on the second set of source code wherein the obfuscation comprises one or more of the removal of comments from the second set of source code, a removal of white spaces from the second set of source code, a swapping of variable names within blocks, a replacing integer literals with compound value, a replacing private method with arbitrary literals, a modifying reference location and injecting a polymorphic source code at one or more location in the second set of source code, thereby generating the secured second set of source code.

14. The system of claim 8, further comprising:

compiling the secured source code by a compiler, wherein the compiler retrieves an encryption key, an access permission from the checkout ID and decrypts the secured source code using the encryption key and the access permission; and verifying an expiration time of the checkout ID and checking in the first set of source code modifications to the source code associated with the application.

15. A non-transitory computer program product having embodied thereon a computer program for enabling a hybrid deployment of an application, the computer program product storing instructions, the instructions comprising instructions for:

receiving a source code associated with an application, and a defect identification number associated with a defective feature in the application;

identifying a first set of source code and a second set of source code from the source code based on a defect investigation methodology and the defect identification number, wherein the first set of source code is associated with the defective feature of the application, the second set of source code is associated with one or more non-defective features of the application, and wherein the first set of source code comprises a first set of source code modifications and one or more secondary source code;

generating a checkout ID associated with the application, wherein the checkout ID comprises access parameters and an expiration time, and wherein the expiration time is indicative of an access time to a third party based on a pre-defined policy;

generating a secured second set of source code based on the second set of source code and one of an encryption methodology and an obfuscating methodology; and providing a secured source code and the checkout ID to the third party for debugging the defective feature in the application, wherein the secured source code further comprises the first set of source code and the secured second set of source code.

* * * * *